United States Patent
Yu et al.

(10) Patent No.: US 8,806,313 B1
(45) Date of Patent: Aug. 12, 2014

(54) AMPLITUDE-BASED ANOMALY DETECTION

(75) Inventors: Kevin Yu, Palo Alto, CA (US); Yu Xie, Beijing (CN); Xinyi Zhang, San Jose, CA (US)

(73) Assignee: Google Inc., Mountain View, CA (US)

(\*) Notice: Subject to any disclaimer, the term of this patent is extended or adjusted under 35 U.S.C. 154(b) by 96 days.

(21) Appl. No.: 13/480,084

(22) Filed: May 24, 2012

(51) Int. Cl.
*G06F 11/00* (2006.01)
(52) U.S. Cl.
USPC ............................ 714/799; 714/795; 714/755
(58) Field of Classification Search
USPC .................... 714/799, 795, 786, 784, 755, 25
See application file for complete search history.

(56) References Cited

U.S. PATENT DOCUMENTS

| | | | |
|---|---|---|---|
| 6,625,569 B2 * | 9/2003 | James et al. | 702/183 |
| 7,080,290 B2 * | 7/2006 | James et al. | 714/47.2 |
| 7,802,165 B2 * | 9/2010 | Jain et al. | 714/755 |

\* cited by examiner

*Primary Examiner* — Fritz Alphonse
(74) *Attorney, Agent, or Firm* — John D. Lanza; Foley & Lardner LLP (57) ABSTRACT

Systems and methods are disclosed herein for identifying an anomaly in a signal, where samples in the signal correspond to an amount of data flow in a network within a time interval, and an anomaly corresponds to at least one sample in the discrete signal having a likelihood value below a likelihood threshold. A historical probability distribution of the discrete signal is generated based on previously received samples. For each sample in a plurality of samples in the discrete signal, a likelihood is computed based at least in part on the historical probability distribution. A likelihood threshold is selected, and a set of consecutive samples is identified as an anomaly when each sample in the set has a computed likelihood below the likelihood threshold.

18 Claims, 6 Drawing Sheets

AMPLITUDE-BASED ANOMALY DETECTION

TECHNICAL FIELD

The systems and methods described herein relate to data analysis, and particularly, to detecting an anomaly in a signal.

BACKGROUND

Many signals derived from real world systems exhibit anomalous behaviors such as sudden transients in the form of spikes or dips. It is often desirable to detect these anomalies in signals so that the anomalies may be characterized. In particular, statistics based anomaly detection algorithms determine a range based on estimated statistics of the signal. For example, the range may correspond to a number of standard deviations away from a mean, and samples outside the range may be identified as anomalies. Statistics based anomaly detection may offer several advantages, such being robust (the detection is not as susceptible to noise as other methods), and having low false alarm rates. However, statistics based anomaly detection also has several disadvantages. In particular, these algorithms compress a large amount of information found in a distribution into a single range. By using a range to characterize a distribution, these algorithms lose a lot of information in the distribution, such as the overall shape of the distribution. Importantly, the performance of these algorithms is especially poor when the distribution is not heavily weighted at a centroid.

Systems and methods to detect anomalies would therefore be of great benefit in data analysis.

SUMMARY

Accordingly, the systems and methods described herein include, among other things, providing a method to detect anomalies in a signal. Samples in the discrete signal correspond to amounts of data flow in a network within a time interval. An anomaly corresponds to at least one sample in the discrete signal having a likelihood value below a likelihood threshold. The method comprises generating a historical probability distribution of the discrete signal based on previously received samples. For each sample in a plurality of samples in the discrete signal, a likelihood is computed based at least in part on the historical probability distribution. A likelihood threshold is selected, and a set of consecutive samples is identified as an anomaly when each sample in the set has a computed likelihood below the likelihood threshold.

In one embodiment, an anomaly is indicative of a traffic burst in the data flow, and the historical probability distribution represents amounts of data flow during standard operation of the network without anomalies. The traffic burst corresponds to an amount of data flow larger than a data threshold determined based on the historical probability distribution.

In one embodiment, identifying the set of consecutive samples as an anomaly comprises identifying a start of the anomaly. Identifying a start of an anomaly comprises selecting a lower bound below the likelihood threshold, wherein the lower bound is used for identifying the start of the anomaly and identifying a first sample below the likelihood threshold. A sample following the first sample is iteratively selected, consecutive samples from the first sample to the selected sample are grouped, and an aggregate likelihood value for the selected sample is computed based on the grouped samples. The first sample is identified as the start of the anomaly when an aggregate likelihood value is below the lower bound for a second sample following the first sample. Optionally, a sample immediately preceding the first sample is above the likelihood threshold, and the second sample is an initial sample immediately following the first sample with an aggregate likelihood value below the lower bound.

In one embodiment, identifying the set of consecutive samples as an anomaly comprises identifying an end of the anomaly. Identifying an end of an anomaly comprises selecting an upper bound above the likelihood threshold, wherein the upper bound is used for identifying the end of the anomaly, and identifying a third sample above the likelihood threshold, wherein the third sample follows the first sample. A sample following the third sample is iteratively selected, consecutive samples from the third sample to the selected sample are grouped, and an aggregate likelihood value for the selected sample is computed based on the grouped samples. The third sample is identified as the end of the anomaly when an aggregate likelihood value is above the upper bound for a fourth sample following the third sample. In one embodiment, each sample between the first and third samples has a likelihood value below the likelihood threshold. Optionally, a sample immediately following the third sample is above the likelihood threshold, and the fourth sample is an initial sample immediately following the third sample with an aggregate likelihood value above the upper bound. In one embodiment, the aggregate likelihood is an average likelihood value of the grouped samples.

In one embodiment, the historical probability distribution is generated based on a histogram generated from the previously received samples.

According to another aspect, the systems and methods described herein relate to an apparatus to carry out the methods described above. In particular, an apparatus is described for identifying an anomaly in a discrete signal. Samples in the discrete signal correspond to amounts of data flow in a network within a time interval. An anomaly corresponds to at least one sample in the discrete signal having a likelihood value below a likelihood threshold. The apparatus comprises a non-transitory memory, a generation processor for generating a historical probability distribution of the discrete signal based on previously received samples, and a computation processor for computing a likelihood for each sample in a plurality of samples in the discrete signal based at least in part on the historical probability distribution. The apparatus further comprises an anomaly detection processor for selecting a likelihood threshold and identifying a set of consecutive samples as an anomaly, wherein each sample in the set has a computed likelihood below the likelihood threshold.

In one embodiment, an anomaly is indicative of a traffic burst in the data flow, and the historical probability distribution represents amounts of data flow during standard operation of the network without anomalies. The traffic burst corresponds to an amount of data flow larger than a data threshold determined based on the historical probability distribution.

In one embodiment, identifying the set of consecutive samples as an anomaly comprises identifying a start of the anomaly. Identifying a start of an anomaly comprises selecting a lower bound below the likelihood threshold, wherein the lower bound is used for identifying the start of the anomaly and identifying a first sample below the likelihood threshold. A sample following the first sample is iteratively selected, consecutive samples from the first sample to the selected sample are grouped, and an aggregate likelihood value for the selected sample is computed based on the grouped samples. The first sample is identified as the start of the anomaly when an aggregate likelihood value is below the lower bound for a second sample following the first sample. Optionally, a sample immediately preceding the first sample is above the likelihood threshold, and the second sample is an initial sample immediately following the first sample with an aggregate likelihood value below the lower bound.

In one embodiment, identifying the set of consecutive samples as an anomaly comprises identifying an end of the anomaly. Identifying an end of an anomaly comprises selecting an upper bound above the likelihood threshold, wherein the upper bound is used for identifying the end of the anomaly, and identifying a third sample above the likelihood threshold, wherein the third sample follows the first sample. A sample following the third sample is iteratively selected, consecutive samples from the third sample to the selected sample are grouped, and an aggregate likelihood value for the selected sample is computed based on the grouped samples. The third sample is identified as the end of the anomaly when an aggregate likelihood value is above the upper bound for a fourth sample following the third sample. In one embodiment, each sample between the first and third samples has a likelihood value below the likelihood threshold. Optionally, a sample immediately following the third sample is above the likelihood threshold, and the fourth sample is an initial sample immediately following the third sample with an aggregate likelihood value above the upper bound. In one embodiment, the aggregate likelihood is an average likelihood value of the grouped samples.

In one embodiment, the historical probability distribution is generated based on a histogram generated from the previously received samples.

BRIEF DESCRIPTION

The systems and methods described herein are set forth in the appended claims. However, for the purpose of explanation, several embodiments are set forth in the following figures.

DETAILED DESCRIPTION OF CERTAIN ILLUSTRATIVE EMBODIMENTS

To provide an overall understanding of the disclosure, certain illustrative embodiments will now be described, including a system for detecting an anomaly in a signal. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
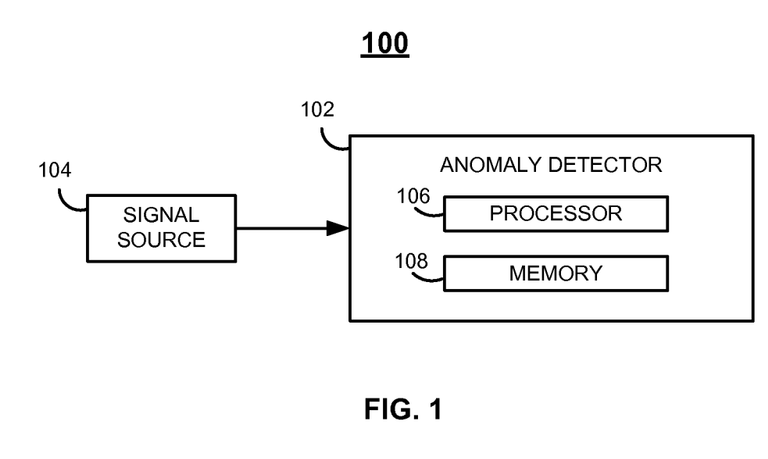
FIG. 1 illustrates one embodiment of a system for detecting anomalies in a signal.

FIG. 1 illustrates one embodiment of a system 100 for detecting anomalies of a signal. The system 100 includes a signal source 104 and an anomaly detector 102 including a processor 106 and a memory unit 108.

The signal source 104 provides a signal to the probability distribution estimator 102, and can be any source of a signal. The signal may be a discretized version of a continuous signal. As an example, the signal source 104 may include a device that monitors an amount of traffic flow in a network, and the signal may be a vector of discrete samples corresponding to an amount of traffic flow in the network as a function of time. In an example, the signal may correspond to a number of data packets arriving at a particular node in the network in a given time window. The signal source 104 may further be configured to process the signal to get the signal into a certain form, such as by controlling the amplitude of the signal or adjusting other characteristics of the signal. For example, the signal source 104 may quantize the signal, filter the signal, or perform any number of processing techniques on the signal. In general, any signal source may be used, if it is desirable to detect anomalies in the provided signal.

In an example, the signal may be processed by removing trend and cyclic patterns. In particular, determination of a linear trend is described in detail in U.S. patent application Ser. No. 13/446,842, which is incorporated herein in entirety by reference. Determining a linear trend component of a signal may first include detecting trend change points in a signal, corresponding to points in a signal where the underlying distribution changes. Bayesian methods and maximum likelihood techniques may be used to detect trend change points in the signal. For example, a number of consecutive samples of the signal may be appended to a buffer, and Bayesian methods are used to determine which, if any, sample in the buffer corresponds to a trend change point. In addition, the processor 106 may identify multiple linear trends at different time scales by repeating the above analysis using different values for the number of consecutive samples appended to the buffer, for example.

In another example, determination of a nonlinear trend is described in detail in U.S. patent application Ser. No. 13/483,601, which is incorporated herein in entirety by reference. Determining a nonlinear trend component of a signal may first include decomposing the signal into multiple components. The signal decomposition may be performed in a number of ways, such as using empirical mode decomposition. Components may be determined to be trend or noise components based on a comparison between a frequency in the component and a cut-off frequency. In addition, the processor 106 may identify multiple nonlinear trends at different time scales by repeating the above analysis using different values for the cut-off frequency, for example.

The identified trend may include any number of linear trends and any number of nonlinear trends. The identified trend may be chosen to be any combination of linear and nonlinear trends that minimizes an error, for example.

In addition, a cyclic pattern in the signal may be identified. Determination of a cyclic component of a signal is described in detail in U.S. patent application Ser. No. 13/488,875, which is incorporated herein in entirety by reference. Determining the cyclic pattern may include first identifying a period of interest and segmenting the signal based on the identified period. The resulting segments may then be superimposed, thus building a point-by-point model of the cyclic pattern. In addition, the processor 106 may identify multiple cyclic components at different time scales by repeating the above analysis using different values for the period, for example. The identified cyclic pattern may include any number of cyclic components.

The identified trend and/or cyclic pattern may be removed from the signal, resulting in a residual signal that may be provided to various anomaly detection algorithms, as is described in detail in U.S. patent application Ser. No. 13/480,042.

The anomaly detector 102 is a device that detects anomalies in a signal provided by the signal source 104. Identifying anomalies in a signal is useful for many reasons. For example, the signal received from the signal source 104 may represent an amount of data traffic activity in a network. Network traffic is often bursty, meaning the signal includes unexpected and unpredictable bursts in activity. These traffic bursts may be identified as anomalies in a signal representative of an amount of network traffic over time. Identifying these bursts is important for characterizing activity levels in the network. In an example, if a large number of traffic bursts occurs at a specific location in a network, causing long latencies and poor network performance, one or more components at the network location may need to be replaced. For example, buffers that temporarily store incoming data at the network location may need to be replaced with larger buffers, which are better equipped to handle large amounts of data. Network traffic is just one example of where detection of anomalies may be useful. In general, anomaly detection is useful in a number of fields and may often lead to improved systems in multiple applications.

The anomaly detector 102 includes a processor 106 and a memory unit 108. As used herein, the term "processor" or "computing device" refers to one or more computers, microprocessors, logic devices, servers, or other devices configured with hardware, firmware, and software to carry out one or more of the techniques described herein. An illustrative computing device 600, which may be used to implement any of the processors described herein, is described in detail below with reference to FIG. 6. The memory unit 108 is configured to store input data, output data, and data currently being processed by the processor 106.

Any suitable variation of system 100 may be used to detect an anomaly in a signal. For example, additional processors or memory units may be used to process or store data. In addition, the processor 106 may include a memory unit to store any or all of the data used during processing. In another example, the anomaly detector 102 may be included within the same device as the signal source 104. However, for ease of discussion, the remainder of this disclosure will describe detecting anomalies in a signal with reference to the system 100 of FIG. 1.

Figure 2:
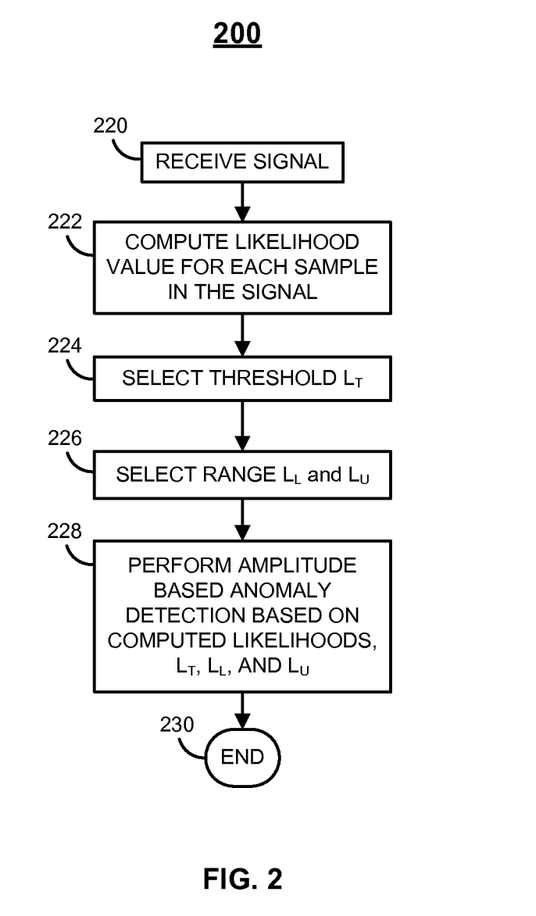
FIG. 2 is a flow chart of one illustrative method for detecting anomalies in a signal.

FIG. 2 is a flow chart of one illustrative method 200 used by the processor 106 for detecting an anomaly in a signal, such as a signal received by the signal source 104. In particular, the method 200 describes a method for computing likelihood values for samples in a signal and selecting parameters to be used for detection of a beginning and an end of an anomaly in the signal. In the method 200, a likelihood value is computed for each sample in a signal. The likelihood value for each sample may be based on a historical probability distribution of the signal. Samples with low likelihood values are less likely to occur than samples with higher likelihood values. A likelihood threshold is selected, and samples in the signal are iteratively selected (consecutively, for example). The likelihood value of the selected sample is compared to the threshold value. A set of consecutive samples is identified as an anomaly when their likelihood values are below the threshold.

Figure 3:
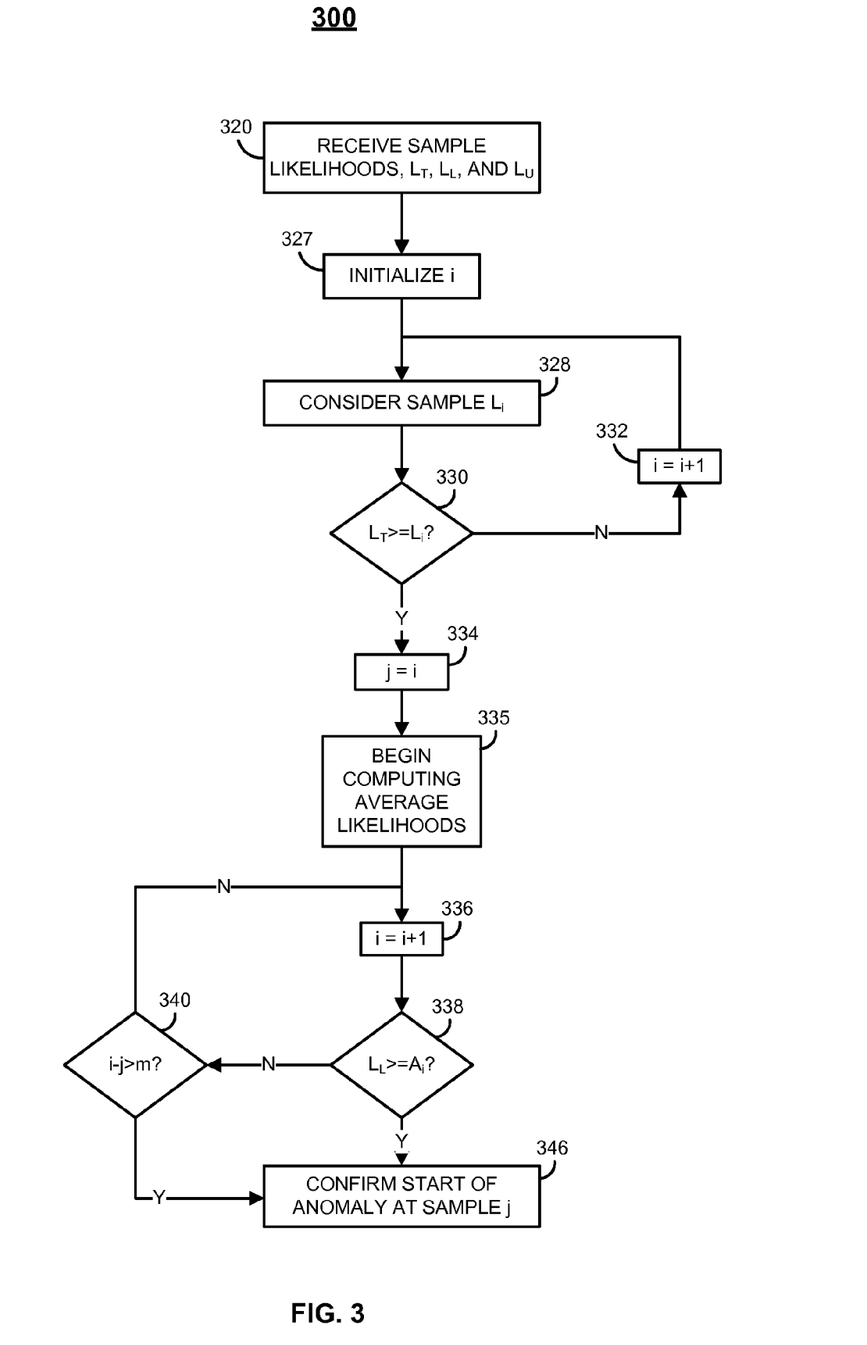
FIG. 3 is a flow chart of one illustrative method for detecting a beginning of an anomaly in a signal.
Figure 4:
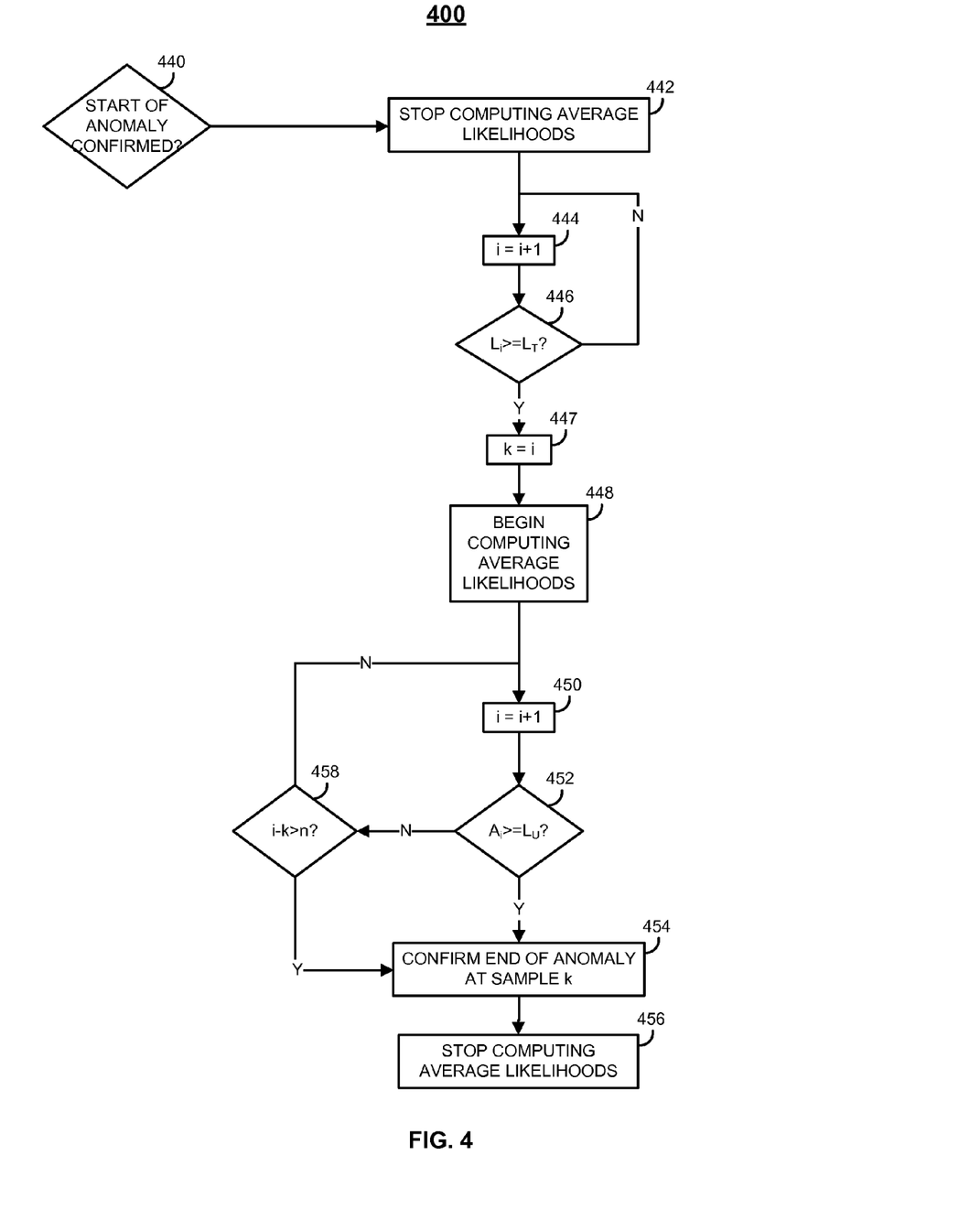
FIG. 4 is a flow chart of one illustrative method for detecting an end of an anomaly in a signal.

As is described in more detail for FIGS. 3 and 4, the method 200 uses an average likelihood value to determine the beginning and end of an anomaly. In particular, a range of likelihood values (including a lower bound and an upper bound) around the threshold is determined, and the beginning of an anomaly is confirmed when an average likelihood value for a subset of samples in the signal falls below the lower bound. Similarly, the end of an anomaly is confirmed when an average likelihood value for a subset of samples in the signal exceeds the upper bound. By using average likelihood values to determine the beginning and end of an anomaly, the method 200 provides more robust anomaly detection than simpler thresholding methods.

The depicted method 200 includes the steps of receiving a signal (step 220), computing a likelihood value for each sample in the signal (step 222), selecting a threshold $L_T$ (step 224) and a range, including a lower bound $L_L$ and an upper bound $L_U$ (step 226), and performing amplitude based anomaly detection based on the computed likelihoods, the threshold $L_T$, and the range $L_L$ and $L_U$ (step 228).

First, at step 220, the processor 106 receives a signal from the signal source 104. As described in relation to FIG. 1, the signal may be representative of an amount of traffic flow in a network, such as a number of data packets that arrive at a location within a particular time window. Samples of the signal may be stored in the memory unit 108. In other applications, the signal may be representative of other events or values, and in general, any signal may be used.

At step 222, the processor 106 computes a likelihood value for each sample in the signal. A likelihood value may be computed based on an estimated probability distribution of the signal. In an example, as described in relation to FIG. 1, the signal may first be processed by removing a trend and/or cyclic pattern. The result may be a residual signal, in which each sample may be modeled with the same random variable, such that the samples are identically distributed. The probability distribution of the samples may be estimated using probability distribution estimation methods. In particular, determination of an estimation of a probability distribution of a set of values (such as samples in a signal) is described in detail in U.S. patent application Ser. No. 13/480,124, which is incorporated herein in entirety by reference. In an example, the samples in the signal may estimate a probability distribution by identifying and removing outlier samples from the signal and generating a histogram based on the remaining samples. The histogram may then be extended (by using a parametric function to estimate the tails of the histogram) and normalized to result in an estimated probability distribution. A likelihood value of a sample may be simply read off of the estimated probability distribution. Thus, the likelihood value of a sample may be computed based on an estimated historical probability distribution of the received signal. However, any other suitable method of determining a likelihood value may be used.

The likelihood value in units of probability may be used (ranging 0 to 1), or the log likelihood value may be used (ranging −Inf to 0). Alternatively, any other processing may be performed on the likelihood values to appropriately scale and/or adjust the range of possible likelihood values.

At step 224, a likelihood threshold parameter $L_T$ is selected. The threshold $L_T$ corresponds to a likelihood value and is used for comparison to the likelihood values computed at step 222. In particular, if a set of samples has likelihood values below $L_T$ (corresponding to unlikely samples), the set of samples may be identified as an anomaly. The processor 106 may select $L_T$ in a number of ways. In an example, a user provides input to the anomaly detector 102, and the processor 106 selects $L_T$ based on the user input. In some cases, the user input may be precisely $L_T$, or the processor 106 may process the user input to derive an appropriate value for $L_T$. For example, the user input may include a likelihood value within a range from 0 to 1, and the processor 106 may compute the log of the user input such that the derived value is within a range from –Inf to 0.

In general, it may be desirable to use different values of $L_T$ for different types of signals or for different types of anomaly detection processes. For example, a high value for $L_T$ may be used for detection of long anomalies and/or many anomalies. In contrast, a lower $L_T$ value may be useful for detection of shorter anomalies and/or fewer anomalies.

At step 226, a likelihood range, including a lower bound $L_L$ and an upper bound $L_U$, is selected. The lower bound $L_L$ is a likelihood value below $L_T$ ($L_L < L_T$), and the upper bound $L_U$ is a likelihood value above $L_T$ ($L_U > L_T$). The bounds $L_L$ and $L_U$ are compared to average likelihood values (as will be described in more detail below) to confirm the start and end of an anomaly. In particular, a first sample may be identified as having a likelihood value below $L_T$. The samples preceding the first sample may have likelihood values above $L_T$. Because the first sample has a low likelihood, a beginning of an anomaly is suspected, but not yet confirmed. The average likelihood values may be computed for the samples immediately following the first sample, and may correspond to the average likelihood value for the set of samples between the first sample and a current sample. A second sample may be identified with an average likelihood value below the lower bound $L_L$. Upon identifying the second sample, an anomaly may be confirmed to have begun at the first sample. Similarly, a third sample following the first sample may be identified as having a likelihood value above $L_T$. Again, because the third sample has a high likelihood, an end of an anomaly is suspected, but not yet confirmed. The average likelihood values may be computed for the samples immediately following the third sample, and a fourth sample may be identified with an average likelihood value above the upper bound $L_U$. Upon identifying the fourth sample, the anomaly may be confirmed to have ended at the third sample.

Similar to the selection of the likelihood threshold $L_T$ at step 224, the processor 106 may select $L_L$ and $L_U$ in a number of ways, including basing the selection on user input. In addition, the processor 106 may process the user input to derive appropriate values for $L_L$ and $L_U$. In an example, the user input may include a δ value, and $L_L$ and $L_U$ are computed based on $L_T$ and δ (e.g., $L_L = L_T - δ$ and $L_U = L_T + δ$). In this case, the range $L_L$ to $L_U$ may be symmetric around the threshold $L_T$. In the example above, a small value for δ (corresponding to a small likelihood range such that $L_L$ and $L_U$ are both near $L_T$) may be used if it is desirable to confirm the start of an anomaly soon after identifying the first sample and confirm the end of an anomaly soon after identifying the third sample. In this case, it may be more likely the method 200 resembles a simple thresholding process. In an extreme example, if δ is zero, then the first sample (for which a beginning of an anomaly is suspected) and second sample (for which the beginning of an anomaly is confirmed) are the same sample. In addition, the third sample (for which an end of an anomaly is suspected) and fourth sample (for which the end of an anomaly is confirmed) are also the same sample. Alternatively, a large value for δ may be used if it is desirable to confirm the start and end of an anomaly later than the first and third samples, respectively.

Otherwise, values for the lower bound $L_L$ and the upper bound $L_U$ may be asymmetric around the likelihood threshold $L_T$. For example, in some cases, low values for both $L_L$ and $L_U$ relative to $L_T$ ($L_L \ll L_T$, and $L_T < L_U$) may be used if it's desirable to be difficult to confirm a beginning of an anomaly but easier to confirm the end of an anomaly. In particular, a lower value may be used for $L_L$ if it is desirable to have a stricter requirement for confirmation of a beginning of an anomaly, and a less strict requirement for confirmation of an end of an anomaly. This may be desirable for detection of short anomalies. In other cases, high values for both $L_L$ and $L_U$ relative to $L_T$ ($L_L < L_T$, and $L_T \ll L_U$) may be used for detection of longer anomalies. In particular, high values for the lower and upper bounds imposes a less strict requirement for confirmation of a beginning and a stricter requirement for confirmation of an end of an anomaly.

At step 228, amplitude based anomaly detection is performed based on the computed likelihoods (from step 222), the likelihood threshold $L_T$ (from step 224), and the likelihood range (from step 226). In particular, amplitude based anomaly detection may use the methods illustrated in FIGS. 3 and 4 to detect a beginning and an end of an anomaly, respectively.

FIG. 3 is a flow chart of one illustrative method 300 for detecting a beginning of an anomaly in a signal. In particular, the method 300 describes identifying a beginning of an anomaly by first suspecting a sample is a beginning of an anomaly when the sample's likelihood value is below the likelihood threshold $L_T$. The method 300 further describes confirming the sample as a beginning of an anomaly upon identifying another sample, for which an average likelihood value for the other sample is below the lower bound $L_L$.

The method 300 begins by receiving a set of sample likelihoods, a likelihood threshold $L_T$, and a likelihood range $L_L$ and $L_U$ (step 320) and initializing an iteration parameter i (step 327). When an unlikely sample (if the threshold $L_T$ exceeds the sample likelihood value $L_i$) is found (decision block 330), the unlikely sample is stored as j (step 334). The sample j is stored because sample j is suspected to be the beginning of an anomaly (because of its low likelihood value). In addition, the processor 106 begins to compute an average likelihood value $A_i$ for the next immediate sample(s) after sample j (step 335). The average likelihood(s) $A_i$ are compared to the lower bound $L_L$ (decision block 338), and when $L_L$ exceeds $A_i$, the sample j is confirmed to be the beginning of an anomaly (step 346). If a sample is not found for which $L_L$ exceeds A, within a predetermined number of samples after sample j (decision block 340), a start of the anomaly is confirmed, anyway (step 346).

At step 320, the set of sample likelihoods (e.g., computed at step 222 in method 200), the likelihood threshold $L_T$ (e.g., selected at step 224), and the likelihood range $L_L$ and $L_U$ (e.g., selected at step 226) are received. Based on these received values, anomalies corresponding to sets of unlikely and consecutive samples may be detected in a signal.

At step 327, an iteration parameter i is initialized. The iteration parameter i corresponds to a sample number (i.e., indicative of a time stamp corresponding to the sample number multiplied by the sampling period of the discrete signal). In particular, the sample number i may be initialized to one if it is desirable to begin anomaly detection at the beginning of the signal. Otherwise, if a portion of the signal has already been processed for anomaly detection, the sample number i may be initialized to a suitable value corresponding to the beginning of an unprocessed portion of the signal.

At step 328, sample i and its likelihood value $L_i$ is considered, and at decision block 330, the sample's likelihood value $L_i$ is compared to $L_T$. If the sample's likelihood value $L_i$ exceeds $L_T$, the method proceeds to step 332 to increment the iteration parameter i until a sample is found with a likelihood value $L_i$ below (or equal to) $L_T$. Alternatively, the decision block 330 may include a strict requirement that the likelihood value $L_i$ is below $L_T$. When a sample with a low enough likelihood value is identified, a beginning of an anomaly is suspected at this sample.

At step 334, the iteration parameter i is saved as another parameter j. The parameter j represents a sample index corresponding to a suspected beginning of an anomaly. In addition, at step 335, the processor 106 begins to compute an average likelihood value for the following samples. The average likelihood value for the following samples may be computed as the average of the likelihood values for a set of samples between sample j and a current sample i (i.e., the set may be inclusive or exclusive for the sample j and the sample i). In particular, a flag variable indicating whether to compute average likelihood values may be stored in the memory unit, and may have been set to 0 previously. When a beginning of an anomaly is suspected (i.e., when sample j is reached), the flag variable may be toggled to 1.

At step 336, the iteration parameter i is incremented, and an average likelihood value $A_i$ is computed for the sample i. In particular, the average likelihood value $A_i$ may correspond to an average of the likelihood values for samples j through the current sample i. For example, for the first sample after sample j, the average likelihood value $A_i$ is the average of two values: $L_j$ and $L_{j+1}$. For the second sample, $A_i$ is the average of three values: $L_j$, $L_{j+1}$, and $L_{j+2}$. In another example, the average likelihood value $A_i$ is computed based on likelihood values for samples j+1 through the current sample i, such that the sample j is not included in the computation of $A_i$. Any suitable method of including or excluding endpoints in the group of samples for computing $A_i$ may be used. The computation of the average likelihood value $A_i$ for a sample has been described as based on a mean of likelihood values for a set of samples. However, $A_i$ may be computed based on a median of a set of likelihood values or any other suitable computation of a set of likelihood values.

At decision block 338, the average likelihood value $A_i$ for the sample i is compared to the lower bound $L_L$. The iteration parameter i is incremented until some threshold is reached, or until a sample is found for which $L_L$ exceeds (or is equal to) $A_i$. Alternatively, the decision block 338 may include a strict requirement that the lower bound $L_L$ exceed the average likelihood value $A_i$.

At decision block 340, the difference between i and j is compared to a confirmation threshold m. If the difference exceeds m, the processor 106 proceeds to step 346 and confirms a start of an anomaly at sample j. In particular, a purpose of the confirmation threshold m is to avoid a situation where the sample j is suspected but not yet confirmed for a large number of samples. The confirmation threshold m represents a maximum number of samples for which it is tolerable for the sample j to be in a suspected (but not yet confirmed) state. In other words, if a sample is not found for which $L_L$ exceeds $A_i$ within m samples after sample j, the sample j is confirmed to be a beginning of an anomaly. Thus, the method 300 illustrates that when m samples after sample j is reached, the start of an anomaly is confirmed.

Alternatively, the confirmation threshold m may be used to discard the suspected state. In particular, if m samples after sample j is reached, and sample j has not yet been confirmed, the suspicion that sample j is a beginning of an anomaly may be removed. In other words, if a sample is not found for which $L_L$ exceeds $A_i$ within m samples after sample j, the sample j is no longer suspected of being a beginning of an anomaly. In this case, the processor 106 may stop computing average likelihood values, reset the iteration parameter i to j+1, and return to the decision block 330 to compare the likelihood value $L_{j+1}$ to the likelihood threshold $L_T$.

At step 346, when a sample is found with a sufficiently low $A_i$ value, or when m samples past sample j is reached, the beginning of an anomaly is confirmed. In particular, the anomaly is confirmed to begin at sample j, corresponding to an initial sample with a low likelihood value (i.e., sample j stored at step 334). Thus, rather than confirming a beginning of an anomaly at sample j, the method 300 confirms the beginning of an anomaly at a sample later than sample j. In particular, the method 300 does not confirm the beginning of an anomaly until a sample is found with a low enough average likelihood value. Thus, a beginning of an anomaly is only confirmed if the samples immediately following the sample j also have low likelihood values, on average.

FIG. 4 is a flow chart of one illustrative method 400 for detecting an end of an anomaly. In particular, the method 400 describes identifying an end of an anomaly by first suspecting a sample is an end of an anomaly when the sample's likelihood value is above the likelihood threshold $L_T$. The method 400 further describes confirming the sample as an end of an anomaly upon identifying another sample, for which an average likelihood value for the other sample is above the upper bound $L_U$.

After the beginning of an anomaly is confirmed (decision block 440), the processor 106 stops computing the average likelihood values $A_i$ (step 442), and the iteration parameter is incremented (step 444) until a likely sample (if the sample likelihood value $L_i$ exceeds $L_T$) is found (decision block 446). When a likely sample is found, the likely sample is stored as k (step 447) because sample k is suspected to be the end of the anomaly (because of its high likelihood value), and the processor 106 again begins to compute an average likelihood value $A_i$ for the next immediate sample(s) after sample k (step 448). The average likelihood(s) $A_i$ are compared to the upper bound $L_U$ (decision block 452), and when $A_i$ exceeds $L_U$, the sample k is confirmed to be the end of the anomaly (step 454). However, if a sample is not found for which $A_i$ exceeds $L_U$ within a predetermined number of samples after sample k (decision block 458), the processor 106 still confirms the end of the anomaly (step 454).

At decision block 440, the processor 106 determines that a start of an anomaly has been confirmed, such as at step 346 in method 300. Alternatively, any other suitable method for identifying the start of an anomaly may be used.

At step 442, the processor 106 ceases computing the average likelihood value. In particular, a flag variable indicative of whether to compute the average likelihood value may be toggled to 0. In the method 400, an average likelihood value is computed for a current sample if the current sample follows a suspected end of an anomaly that has not yet been confirmed.

At step 444, the iteration parameter i is incremented, and the likelihood value of sample i (i.e., $L_i$) is compared to the likelihood threshold (i.e., $L_T$) at decision block 446 until a sample is found for which L exceeds (or is equal to) $L_T$, corresponding to a sample that is likely. Alternatively, the decision block 446 may include a strict requirement that the likelihood value $L_i$ exceed $L_T$.

At step 447, when such a sample is found, as in step 334 of method 300, the iteration parameter i is saved as another parameter k. In addition, at step 448, the processor 106 begins to compute an average likelihood value for the samples following sample k. In particular, a flag variable indicating whether to compute average likelihood values (i.e., set to zero at step 442) may be toggled to 1.

At step 450, the iteration parameter i is incremented, and an average likelihood value $A_i$ is computed for the sample i. In particular, the average likelihood value $A_i$ may correspond to an average of the likelihood values for samples k through the current sample i. For example, for the first sample after sample k, the average likelihood value $A_i$ is the average of two values: $L_k$ and $L_{k+1}$. For the second sample, $A_i$ is the average of three values: $L_k$, $L_{k+1}$, and $L_{k+2}$. In another example, the average likelihood value $A_i$ is computed based on likelihood values for samples k+1 through the current sample i, such that the sample k is not included in the computation of $A_i$. Any suitable method of including or excluding endpoints in the group of samples for computing $A_i$ may be used. The computation of the average likelihood value $A_i$ for a sample has been described as based on a mean of likelihood values for a set of samples. However, $A_i$ may be computed based on a median of a set of likelihood values or any other suitable computation of a set of likelihood values.

At decision block 452, the average likelihood value $A_i$ for the sample i is compared to the upper bound $L_U$. The iteration parameter i is incremented until some threshold is reached, or until a sample is found for which $A_i$ exceeds (or is equal to) $L_U$. Alternatively, the decision block 452 may include a strict requirement that the average likelihood value $A_i$ exceed $L_U$.

At decision block 458, the difference between i and k is compared to a confirmation threshold n. If the difference exceeds n, the processor 106 proceeds to step 454 and confirms an end of the anomaly at sample k. In particular, a purpose of the confirmation threshold n is to avoid a situation where the sample k is suspected but not yet confirmed for a large number of samples. The confirmation threshold n represents a maximum number of samples for which it is tolerable for the sample k to be in a suspected (but not yet confirmed) state. In other words, if a sample is not found for which $L_L$ exceeds $A_i$ within n samples after sample k, the sample k is confirmed to be an end of an anomaly. Thus, the method 400 illustrates that when n samples after sample k is reached, the end of an anomaly is confirmed.

Alternatively, the confirmation threshold n may be used to discard the suspected state. In particular, if n samples after sample k is reached, and sample k has not yet been confirmed, the suspicion that sample k is an end of an anomaly may be removed. In other words, if a sample is not found for which $A_i$ exceeds $L_U$ within n samples after sample k, the sample k is no longer suspected of being an end of an anomaly. In this case, the processor 106 may stop computing average likelihood values, reset the iteration parameter i to k+1, and return to the decision block 446 to compare the likelihood value $L_{k+1}$ to the likelihood threshold $L_T$.

At step 454, when a sample within n samples of sample k is found with a sufficiently high $A_i$ value, or when n samples past sample k is reached, the end of an anomaly is confirmed. In particular, the anomaly is confirmed to end at sample k, corresponding to an initial sample with a high likelihood value (i.e., sample k stored at step 447). Thus, rather than confirming an end of an anomaly immediately at sample k, the method 400 confirms the end of an anomaly at a sample later than sample k. In particular, the method 400 does not confirm the end of an anomaly until a sample is found with a high enough average likelihood value. Thus, an end of an anomaly is only confirmed if the samples immediately following the sample k also have high likelihood values, on average.

At step 456, the processor 106 ceases to compute the average likelihood value. In particular, a flag variable indicative of whether to compute the average likelihood value may be toggled to 0. At this point, a full anomaly has been detected (by identifying and confirming the start and end of the anomaly), and the method proceeds to consider the next sample at steps 232 and 228.

The processes shown in FIGS. 2-4 describe iteratively considering samples in a signal and identifying a beginning and an end of an anomaly by comparing likelihood values to a likelihood threshold and by comparing average likelihood values to upper and lower bounds. In some embodiments, these likelihood values are computed based on an estimated historical probability distribution of previously received samples of the signal. The estimated historical probability distribution may be updated with each received sample, such that a likelihood value for a sample is dependent on the immediately preceding sample. Alternatively, the probability distribution may be updated less frequently. For example, a set of samples may be used as training data for estimation of the probability distribution of samples in a signal. The training data may be updated when an appropriate amount of new samples is received.

In some embodiments, the samples are considered in the order they are received. For example, the iteration parameter i may correspond to a sample index value, representative of a predetermined order of the samples in a signal. In particular, the sample index may represent a point in time (corresponding to the sampling frequency of the signal multiplied by the sample index) or any other suitable metric. The samples may be considered in the order of the sample index, as shown in FIGS. 3-4. Alternatively, the samples may be considered in any other suitable order.

In some embodiments, some processing is performed on the signal before performing anomaly detection as in step 228 of method 200. In particular, the signal may be filtered, smoothed, downsampled, upsampled, interpolated, or any other suitable processing may be performed on the signal.

Figure 5:
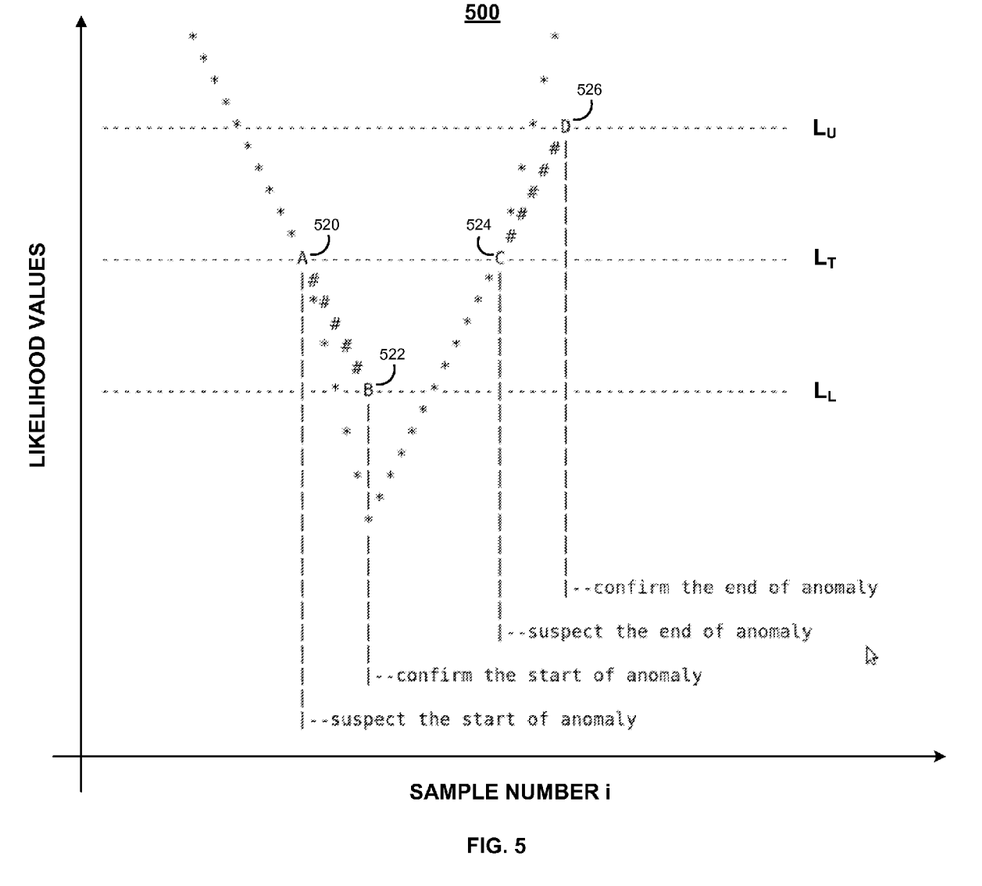
FIG. 5 is a diagram of example likelihood values for samples in a signal.

FIG. 5 is a diagram 500 of example likelihood values for samples in a signal. In particular, the vertical axis of diagram 500 corresponds to likelihood values for samples in a signal defined by the horizontal axis. Horizontal dashed lines correspond to a threshold likelihood $L_T$, an upper bound $L_U$, and a lower bound $L_L$. In diagram 500, each asterisk (*) indicates a likelihood value of a sample in a signal (i.e., $L_i$), and each hash sign (#) indicates an average likelihood value (i.e., $A_i$).

In particular, the diagram illustrates detection of an anomaly (corresponding to samples between points 520 and 524) using the method 200. In some cases, the anomaly includes the sample 520 and excludes the sample 524, but in general may include or exclude either sample 520 or 524. The samples preceding the point 520 have high likelihood values (above the likelihood threshold $L_T$), and because the point 520 corresponds to a likelihood value at the threshold $L_T$, the point 520 corresponds to a suspected start of an anomaly.

Starting with the first sample following the point 520, the processor 106 computes average likelihood values until reaching the point 522, for which the average likelihood value for this sample is at the lower bound $L_L$. Therefore, as of the point 522, the start of the anomaly is confirmed to have occurred at the point 520.

For the samples immediately following the point 522, the likelihood values are compared to the threshold $L_T$, until point 524 is reached, where the likelihood value of the sample $L_i$ is above (or equal to) the threshold $L_T$. Thus, the point 524 corresponds to a suspected end of the anomaly. Starting with the first sample following the point 524, the processor 106 again computes average likelihood values until reaching the point 526, where the average likelihood value for this sample is at the upper bound $L_U$. Therefore, as of the point 526, the end of the anomaly is confirmed to have occurred at the point 524.

Upon confirming the end of the anomaly, the anomaly is confirmed to have occurred between points 520 and 524. The anomaly detector 102 may identify the anomaly by storing information related to the points 520 and 524 (i.e., the corresponding sample index values) in the memory unit 108. The anomaly detector 102 may also output data indicative to the beginning and the end of the anomaly to another device for characterizing the detected anomaly.

Figure 6:
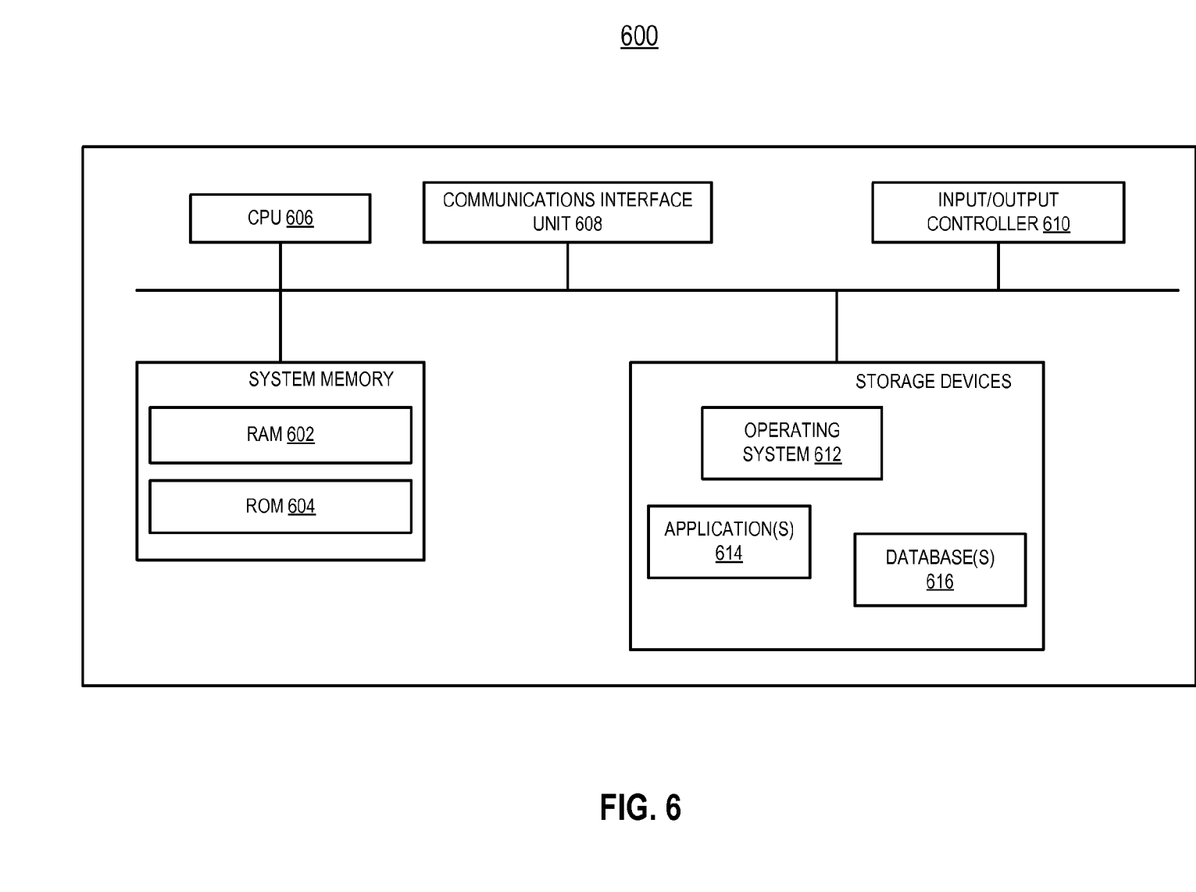
FIG. 6 is a block diagram of a computing device for performing any of the processes described herein.

FIG. 6 is a block diagram of a computing device, such as any of the components of the system of FIG. 1, for performing any of the processes described herein. Each of the components of these systems may be implemented on one or more computing devices 600. In certain aspects, a plurality of the components of these systems may be included within one computing device 600. In certain implementations, a component and a storage device may be implemented across several computing devices 600.

The computing device 600 comprises at least one communications interface unit, an input/output controller 610, system memory, and one or more data storage devices. The system memory includes at least one random access memory (RAM 602) and at least one read-only memory (ROM 604). All of these elements are in communication with a central processing unit (CPU 606) to facilitate the operation of the computing device 600. The computing device 600 may be configured in many different ways. For example, the computing device 600 may be a conventional standalone computer or alternatively, the functions of computing device 600 may be distributed across multiple computer systems and architectures. In FIG. 6, the computing device 600 is linked, via network or local network, to other servers or systems.

The computing device 600 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 608 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 606 comprises a processor, such as one or more conventional microprocessors and one or more supplementary co-processors such as math co-processors for offloading workload from the CPU 606. The CPU 606 is in communication with the communications interface unit 608 and the input/output controller 610, through which the CPU 606 communicates with other devices such as other servers, user terminals, or devices. The communications interface unit 608 and the input/output controller 610 may include multiple communication channels for simultaneous communication with, for example, other processors, servers or client terminals.

The CPU 606 is also in communication with the data storage device. The data storage device may comprise an appropriate combination of magnetic, optical or semiconductor memory, and may include, for example, RAM 602, ROM 604, flash drive, an optical disc such as a compact disc or a hard disk or drive. The CPU 606 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 606 may be connected to the data storage device via the communications interface unit 608. The CPU 606 may be configured to perform one or more particular processing functions.

The data storage device may store, for example, (i) an operating system 612 for the computing device 600; (ii) one or more applications 614 (e.g., computer program code or a computer program product) adapted to direct the CPU 606 in accordance with the systems and methods described here, and particularly in accordance with the processes described in detail with regard to the CPU 606; or (iii) database(s) 616 adapted to store information that may be utilized to store information required by the program.

The operating system 612 and applications 614 may be stored, for example, in a compressed, an uncompiled and an encrypted format, and may include computer program code. The instructions of the program may be read into a main memory of the processor from a computer-readable medium other than the data storage device, such as from the ROM 604 or from the RAM 602. While execution of sequences of instructions in the program causes the CPU 606 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to amplitude-based anomaly detection as described herein. The program also may include program elements such as an operating system 612, a database management system and "device drivers" that allow the processor to interface with computer peripheral devices (e.g., a video display, a keyboard, a computer mouse, etc.) via the input/output controller 610.

The term "computer-readable medium" as used herein refers to any non-transitory medium that provides or participates in providing instructions to the processor of the computing device 600 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 606 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 600 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method for identifying an anomaly in a discrete signal, wherein an anomaly corresponds to at least one sample in the discrete signal having a likelihood value below a likelihood threshold, comprising:
generating, by a processor, a historical probability distribution of the discrete signal based on previously received samples, wherein samples in the discrete signal correspond to amounts of data flow in a network within a time interval;
computing, by the processor, a likelihood for each sample in a plurality of samples in the discrete signal based at least in part on the historical probability distribution;
selecting, by the processor, a likelihood threshold; and
identifying, by the processor, a set of consecutive samples as an anomaly, wherein each sample in the set has a computed likelihood below the likelihood threshold.

2. The method of claim 1, wherein:
an anomaly is indicative of a traffic burst in the data flow;
the historical probability distribution represents amounts of data flow during standard operation of the network without anomalies;
the traffic burst corresponds to an amount of data flow larger than a data threshold determined based on the historical probability distribution.

3. The method of claim 1, wherein identifying the set of consecutive samples as an anomaly comprises identifying a start of the anomaly, comprising:
selecting a lower bound below the likelihood threshold, wherein the lower bound is used for identifying the start of the anomaly;
identifying a first sample below the likelihood threshold;
iteratively selecting a sample following the first sample;
grouping consecutive samples from the first sample to the selected sample;
computing an aggregate likelihood value for the selected sample based on the grouped samples; and
identifying the first sample as the start of the anomaly when an aggregate likelihood value is below the lower bound for a second sample following the first sample.

4. The method of claim 3, wherein a sample immediately preceding the first sample is above the likelihood threshold; and the second sample is an initial sample immediately following the first sample with an aggregate likelihood value below the lower bound.

5. The method of claim 3, wherein identifying the set of consecutive samples as an anomaly comprises identifying an end of the anomaly, comprising:
selecting an upper bound above the likelihood threshold, wherein the upper bound is used for identifying the end of the anomaly;
identifying a third sample above the likelihood threshold, wherein the third sample follows the first sample;
iteratively selecting a sample following the third sample;
grouping consecutive samples from the third sample to the selected sample;
computing an aggregate likelihood value for the selected sample based on the grouped samples; and
identifying the third sample as the end of the anomaly when an aggregate likelihood value is above the upper bound for a fourth sample following the third sample.

6. The method of claim 5, wherein each sample between the first and third samples has a likelihood value below the likelihood threshold.

7. The method of claim 6, wherein
a sample immediately following the third sample is above the likelihood threshold; and
the fourth sample is an initial sample immediately following the third sample with an aggregate likelihood value above the upper bound.

8. The method of claim 5, wherein the aggregate likelihood is an average likelihood value of the grouped samples.

9. The method of claim 1, wherein the historical probability distribution is generated based on a histogram generated from the previously received samples.

10. An apparatus for identifying an anomaly in a discrete signal, wherein an anomaly corresponds to at least one sample in the discrete signal having a likelihood value below a likelihood threshold, comprising:
a non-transitory memory;
a generation processor for generating a historical probability distribution of the discrete signal based on previously received samples, wherein samples in the discrete signal correspond to amounts of data flow in a network within a time interval;
a computation processor for computing a likelihood for each sample in a plurality of samples in the discrete signal based at least in part on the historical probability distribution;
an anomaly detection processor for:
selecting a likelihood threshold; and
identifying a set of consecutive samples as an anomaly, wherein each sample in the set has a computed likelihood below the likelihood threshold.

11. The apparatus of claim 10, wherein:
an anomaly is indicative of a traffic burst in the data flow;
the historical probability distribution represents amounts of data flow during standard operation of the network without anomalies;
the traffic burst corresponds to an amount of data flow larger than a data threshold determined based on the historical probability distribution.

12. The apparatus of claim 10, wherein identifying the set of consecutive samples as an anomaly comprises identifying a start of the anomaly, comprising:
selecting a lower bound below the likelihood threshold, wherein the lower bound is used for identifying the start of the anomaly;
identifying a first sample below the likelihood threshold;
iteratively selecting a sample following the first sample;
grouping consecutive samples from the first sample to the selected sample;
computing an aggregate likelihood value for the selected sample based on the grouped samples; and identifying the first sample as the start of the anomaly when an aggregate likelihood value is below the lower bound for a second sample following the first sample.

13. The apparatus of claim 12, wherein:
a sample immediately preceding the first sample is above the likelihood threshold; and
the second sample is an initial sample immediately following the first sample with an aggregate likelihood value below the lower bound.

14. The apparatus of claim 12, wherein identifying the set of consecutive samples as an anomaly comprises identifying an end of the anomaly, comprising:
selecting an upper bound above the likelihood threshold, wherein the upper bound is used for identifying the end of the anomaly;
identifying a third sample above the likelihood threshold, wherein the third sample follows the first sample;
iteratively selecting a sample following the third sample;
grouping consecutive samples from the third sample to the selected sample; computing an aggregate likelihood value for the selected sample based on the grouped samples; and
identifying the third sample as the end of the anomaly when an aggregate likelihood value is above the upper bound for a fourth sample following the third sample.

15. The apparatus of claim 14, wherein each sample between the first and third samples has a likelihood value below the likelihood threshold.

16. The apparatus of claim 15, wherein
a sample immediately following the third sample is above the likelihood threshold; and
the fourth sample is an initial sample immediately following the third sample with an aggregate likelihood value above the upper bound.

17. The apparatus of claim 14, wherein the aggregate likelihood is an average likelihood value of the grouped samples.

18. The apparatus of claim 10, wherein the historical probability distribution is generated based on a histogram generated from the previously received samples.

* * * * *